United States Patent
Koike et al.

[11] Patent Number: 5,845,960
[45] Date of Patent: Dec. 8, 1998

[54] REAR SPOILER

[75] Inventors: Tsuneyuki Koike, Anjyo; Terutsugu Gotanda, Kariya; Nobutoshi Hase, Nishio; Ryoji Isomura, Handa; Kiyoshi Yamane, Anjyo, all of Japan

[73] Assignee: Aisin Seiki Kabushiki Kaisha, Japan

[21] Appl. No.: 593,405

[22] Filed: Jan. 29, 1996

[30] Foreign Application Priority Data

Jan. 30, 1995 [JP] Japan ................... 7-031820
Jan. 30, 1995 [JP] Japan ................... 7-031821

[51] Int. Cl.⁶ ................................. B62D 35/00
[52] U.S. Cl. ......................... 296/180.1; 296/91
[58] Field of Search .............. 296/180.1, 180.5, 296/91

[56] References Cited

U.S. PATENT DOCUMENTS

| 3,000,663 | 9/1961 | Lucchesi | 296/180.5 |
| 3,097,882 | 7/1963 | Andrews | 296/91 |
| 4,603,898 | 8/1986 | Udagawa et al. | 296/91 |
| 4,881,772 | 11/1989 | Feinberg | 296/91 X |

FOREIGN PATENT DOCUMENTS

| 110232 | 6/1984 | European Pat. Off. | 296/91 |
| 3631467 | 4/1987 | Germany | 296/91 |
| 57-95265 | 6/1982 | Japan . | |
| 62-0012480 | 1/1987 | Japan | 296/180.1 |

*Primary Examiner*—Dennis H. Pedder
*Attorney, Agent, or Firm*—Finnegan, Henderson, Farabow, Garrett & Dunner, L.L.P.

[57] ABSTRACT

A rear spoiler attached to the roof of an automobile is so designed that the ratio of outflow width to inflow width is 0.5~0.9 while the vehicle velocity ratio is made 30 or greater.

11 Claims, 6 Drawing Sheets

REAR SPOILER

BACKGROUND OF THE INVENTION

This invention relates to a rear spoiler for an automobile and, more particularly, to a rear spoiler having an air-flow control function.

Spoilers are attached to the front and rear of an automobile when it is desired to change the original aerodynamic characteristic possessed by the external shape of the vehicle. In this case of a vehicle such as a station wagon where the design is such that the rear window descends from the roof at a fairly steep slope, the rear spoiler is attached at the boundary between the roof and the rear window. An example of such an arrangement is shown in FIG. 3. In the illustrated example, a rear spoiler is attached at the boundary between a roof 1 and a rear window 2 of an automobile. The rear spoiler 3 in effect elongates the longitudinal length of the roof 1 and acts to suppress disturbance of the slipstream as well as lift.

A vehicle utilizing a rear spoiler has been disclosed in the specification of Japanese Patent Application Laid-Open (KOKAI) No. 57-95265 in order to provide not only the above-mentioned effects of a rear spoiler but also to prevent raindrops, snow or dust from attaching to the external surface of the rear window. In this example of the prior art, a slender clearance is provided between the rear spoiler and the rear window, and foreign matter such as rain drops and snow that attempt to attach itself to the rear window is blown off from the rear window by flow of air through the slender clearance and along the rear window.

As mentioned above, a rear spoiler has the basic function of suppressing the disturbance of the slipstream and surppressing lift. Therefore, in a case where air flow along the rear window is produced in an attempt to blow off foreign substances being deposited such as rain water and dust, it is required that such matter be blown off efficiently without sacrificing the aforesaid basic function of the rear spoiler. However, a rear spoiler configuration that performs both of these functions has not yet been developed in the well-known art seen thus far. If one of these functions is satisfied, the other function experiences a marked decline in effectiveness.

SUMMARY OF THE INVENTION

Accordingly, an object of the present invention is to provide a rear spoiler which performs the basic function of a rear spoiler as well as the function of keeping the rear window clean.

Before describing the means for attaining the foregoing object, technical terms used to elucidate the present invention will be described with reference to Fig.

Inflow width: This is the width, which is indicated by $l_1$ in FIG. 1, between the back surface of a roof panel 1 and the inner surface of the rear spoiler at the inlet.

Outflow width: This is the width, which is indicated by $l_2$ in FIG. 1, between the back surface of a roof window 2 and the inner surface of the rear spoiler at the exit.

Approach distance: This is the length, which is indicated by $l_3$ in FIG. 1, along the inner surface of the spoiler.

Amount of projection: This is the distance, which is indicated by $l_4$ in FIG. 1, between a horizontal plane (reference plane) (which passes through the point of intersection between (a) the extended top surface of the roof panel 1 and (b) the extended back surface of the roof panel 1 and back surface of the rear window 2) and the top surface of the rear spoiler. Distance above the reference plane is positive and distance below the reference plane is negative.

Vehicle velocity ratio: This is represented by $V_1/V_2 \times 100$, where $V_1$, is the velocity of the vehicle and $V_2$ is the velocity of air flow exiting from the rear spoiler when the flow of air downward in a direction parallel to back surface of the roof panel 1 and the back surface of the rear window 2 is positive.

The inventors have discovered that by setting values for the aforementioned conditions in such a manner that the vehicle velocity ratio is made approximately 30 or more, substances such as dust, rain water and snow that attempt to attach themselves to the rear window are not only blown off but are not allowed to attach, thereby keeping the rear window clean at all times.

In accordance with the present invention, the foregoing object is attained by providing a rear spoiler in which the ratio of outflow width to inflow width [(outflow width)/(inflow width)] is 0.5~0.9 and the amount of projection is greater than −1 mm. The vehicle velocity ratio is greater than 30. It is preferred that the approach distance be given a value between 20 mm and 100 mm.

It has been found that by making the vehicle velocity ratio greater than 30 in accordance with the invention, the rear window is kept clean at all times without accumulation of substances on the rear window surface. It has been clarified that the ratio of outflow width to inflow width is required to be 0.5~0.9 in order to obtain a vehicle velocity ratio of greater than 30, and that the amount of projection is preferably −1 mm or greater.

Furthermore, in accordance with the present invention, the foregoing object is attained by providing the rear spoiler having an inner surface that is parallel to the back surface of the vehicle, a lower portion of the inner surface protrudes toward the back surface of the rear window and at an angle of 20° or greater with respect to the inner surface, the ratio of outflow width to inflow width is 0.5~0.9 and the amount of projection is −1 mm or greater.

The protrusion of the lower portion of the inner surface of the rear spoiler toward the back surface of the rear window makes it possible to obtain the required ratio of outflow width to inflow width and the required vehicle velocity ratio. The protruding portion prevents foreign matter from attaching itself to the rear window surface during travel of the vehicle while the original function or the rear spoiler is maintained. This provides the driver with excellent visibility through the rear window.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Embodiments of the present invention will now be described in detail with reference to the accompanying drawings.

Figure 1:
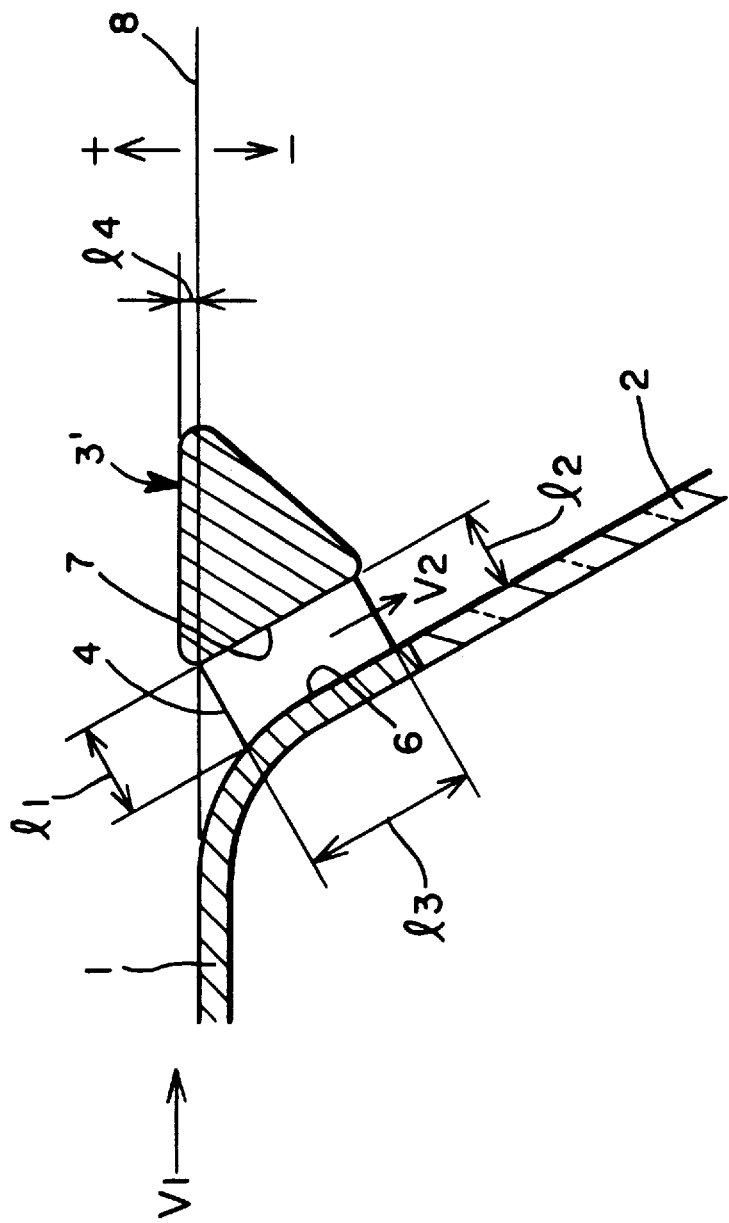
FIG. 1 is a sectional view illustrating a spoiler according to a first embodiment of the present invention.

As shown in FIG. 1, a rear spoiler 3' according to a first embodiment of the invention has mounting pieces 4 at both ends thereof for mounting the rear spoiler 3' on the body of an automobile. A clearance is provided between the back surface 6 of the roof panel 1 and the back surface of the rear window 2, i.e., (a) the back surface 6 of the roof, and (b) the inner surface 7 of the rear spoiler 3'. The clearance should give an inflow width $l_1$ of 20~70 mm and a (output width $l_2$)/(inflow width $l_1$) ratio of 0.5~0.9, and preferably 0.75 which will give a maximum vehicle velocity ratio of 60. In other words, mounting pieces 4 which produce such a clearance are provided on the rear spoiler 3'. The shape of the main body portion of the rear spoiler 3' is not particularly limited. However, the amount of projection between the horizontal plane (reference plane) 8 (which passes through the point of intersection between (a) the extended top surface of the roof panel 1, i.e., the horizontal plane of the roof, and (b) the extended back surface 6 of the roof panel 1 and back surface of the rear window 2) and the top surface of the rear spoiler 3', i.e., the horizontal plane of the rear spoiler 3', should be made greater than −1 mm. That is, the plane passing through the top surface of the rear spoiler 3' should occupy a position no less than 1 mm below the reference plane 8, i.e., a point above the −1 mm position. The upper limit of the amount of projection is +50 mm in consideration of the design of the rear spoiler 3', the design of the vehicle and the aerodynamic characteristic of the vehicle. The approach distance $l_3$ should be made 20 mm or greater. The upper limit of the approach distance $l_3$ is 100 mm in consideration of the design of the rear spoiler 3', the design of the vehicle and the aerodynamic characteristic of the vehicle.

Figure 4:
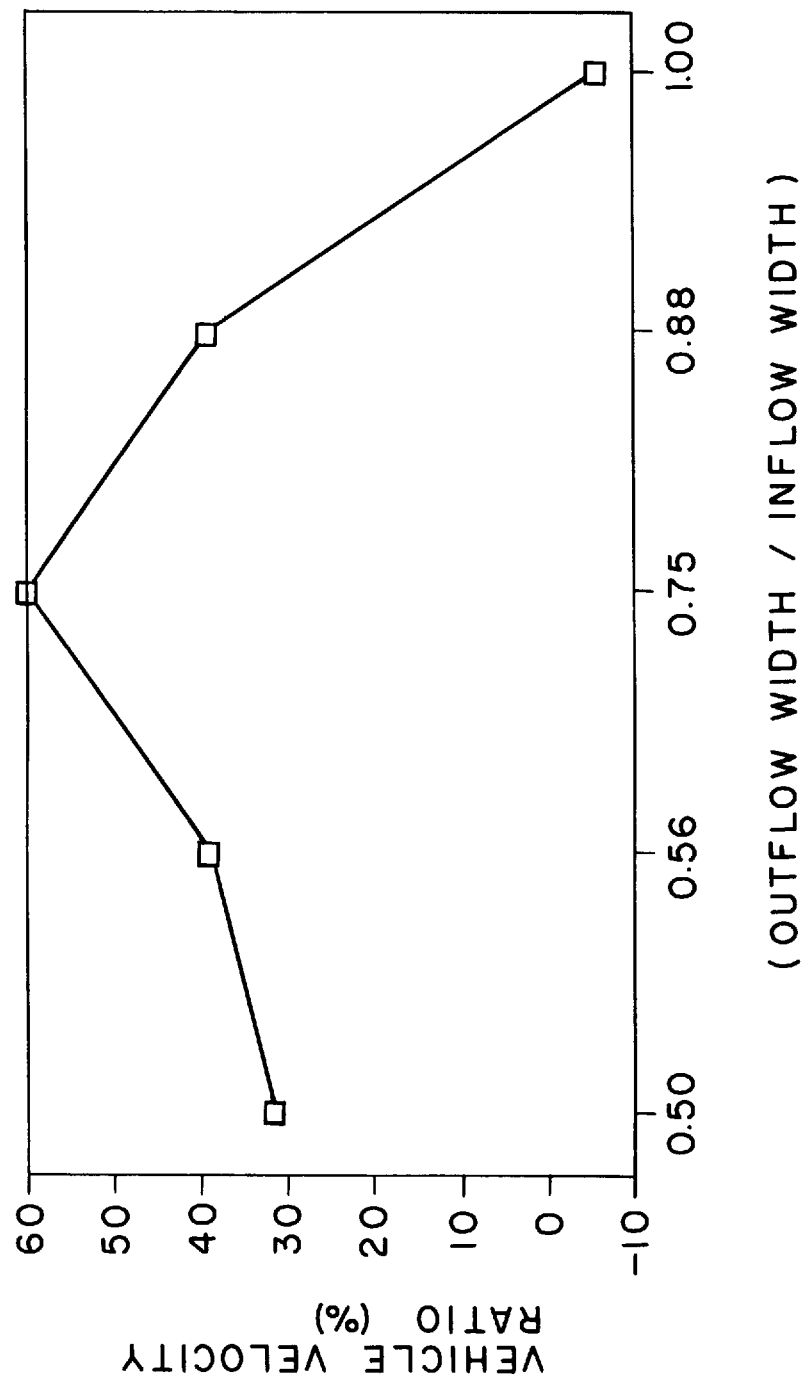
FIG. 4 is a graph showing the relationship between (outflow width)/(inflow width) ratio and vehicle velocity ratio.

FIG. 4 is a graph showing the relationship between the (outflow width)/(inflow width) ratio and the vehicle velocity ratio. It will be understood that the (outflow width)/(inflow width) ratio is required to be 0.5~0.9 in order to make the vehicle velocity ratio 30 or greater.

Figure 5:
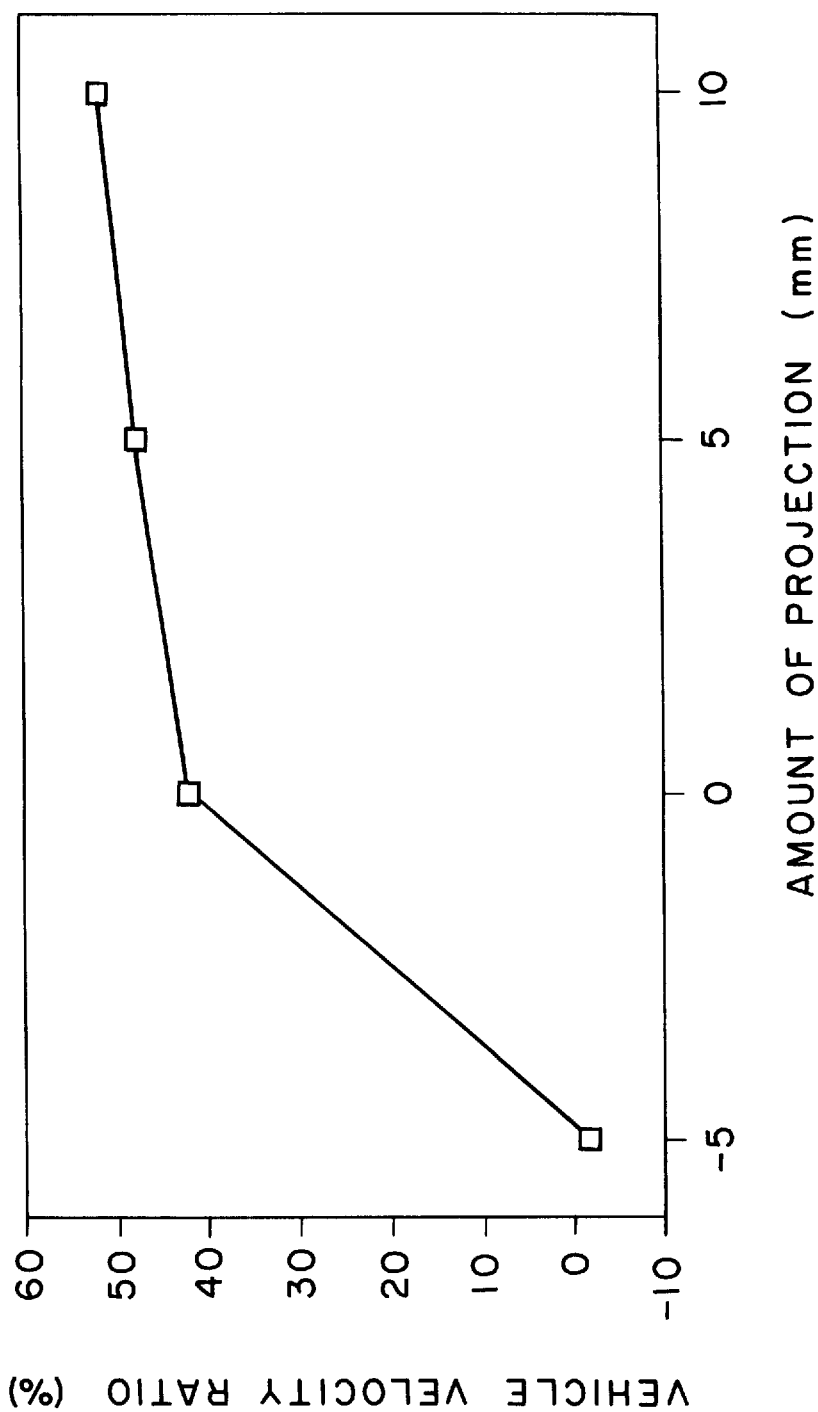
FIG. 5 is a graph showing the relationship between amount of projection and vehicle velocity ratio.

FIG. 5 is a graph showing the relationship between the amount of projection and the vehicle velocity ratio. It is preferred that the amount of projection be made −1 mm or greater in order to make the vehicle velocity ratio 30 or greater.

The rear spoiler according to the first embodiment of the present invention prevents foreign matter from attaching itself to the rear window, thereby assuring that visibility through the rear window will not be hampered. Even if such foreign matter falls upon the rear window, the action of the rear spoiler removes the foreign matter immediately. Moreover, the original function of the rear spoiler is maintained.

Figure 2:
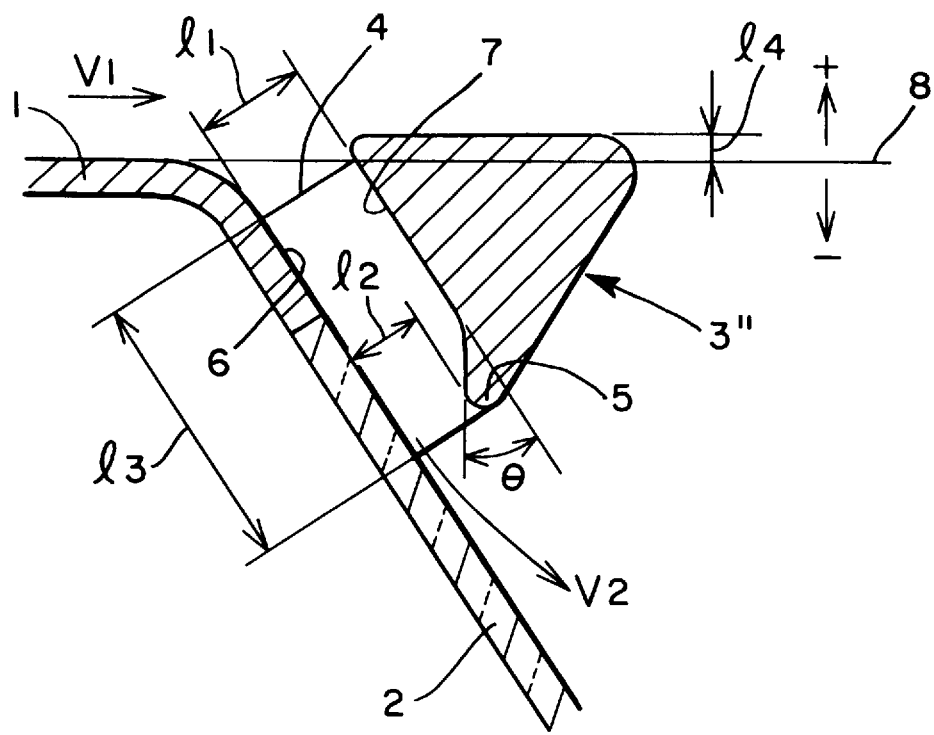
FIG. 2 is a sectional view illustrating a spoiler according to a second embodiment of the present invention.
Figure 3:
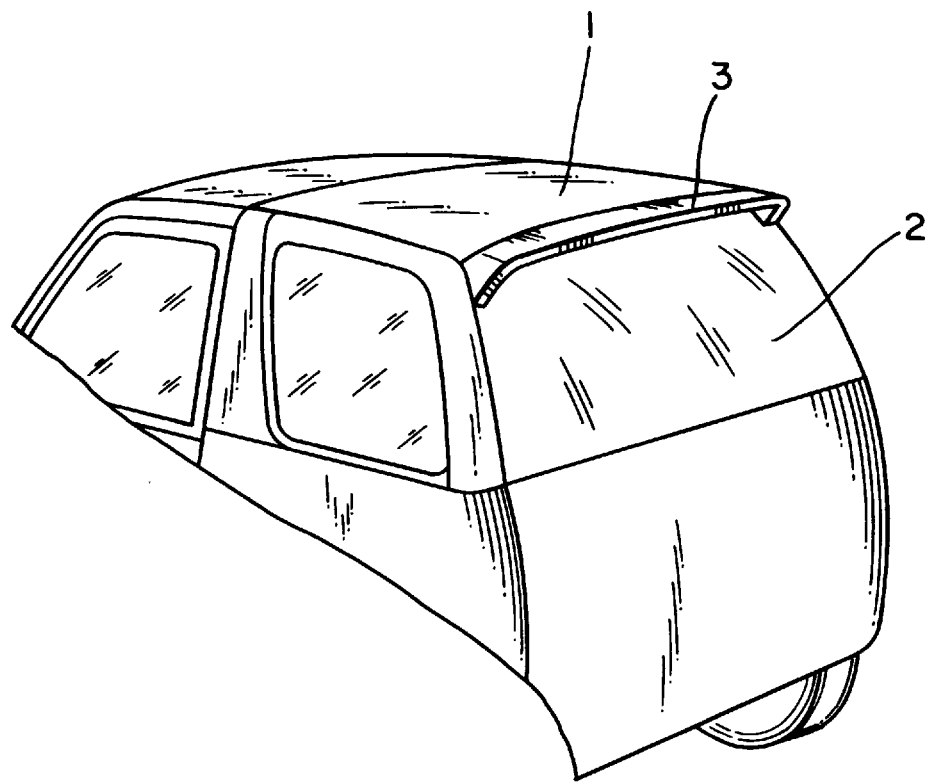
FIG. 3 is a partial perspective view showing a vehicle to which a conventional rear spoiler has been attached.

FIG. 2 is a sectional view illustrating a spoiler 3" according to a second embodiment of the present invention. As in the first embodiment of FIG. 1, the rear spoiler 3" has the mounting pieces 4 at both ends for mounting the rear spoiler 3" on the body of the automobile. The above-mentioned clearance is designed to give the inflow width $l_1$ of 20~70 mm and the (outflow width $l_2$)/(inflow width $l_1$) ratio of 0.5~0.9, preferably 0.75, which will give the maximum vehicle velocity ratio of 60. Mounting pieces 4 which produce such a clearance are provided on the rear spoiler 3". Though the shape of the main body portion of the rear spoiler 3" is not particularly limited, the amount of projection between the reference plane and the top surface of the rear spoiler 3", i.e., the horizontal plane of the rear spoiler 3", should be made greater than −1 mm, with the upper limit of the amount of projection being +50 mm in view of the above-mentioned considerations. The approach characteristic $l_3$ should be made 20 mm or greater, with the upper limit being 100 mm in view of the foregoing considerations.

According to the characterizing feature of the second embodiment, the inner surface 7 of the back spoiler 3" is approximately parallel to the back surface of the rear window 2, namely the back surface 6 of the roof, but is provided with a protrusion 5 projecting toward the rear window 2. The protrusion 5 is provided on the lower one-third of the inner surface 7 and defines an angle of θ with respect to the plane of the inner surface 7. The angle θ is made 20° or greater and preferably is selected between 30° and 35° to provide the maximum vehicle velocity ratio. The lower portion of the protrusion 5 is made arcuate in shape to minimize disturbance of the air flow.

The relationships shown in the graphs of FIGS. 4 and 5 apply to this embodiment as well.

Figure 6:
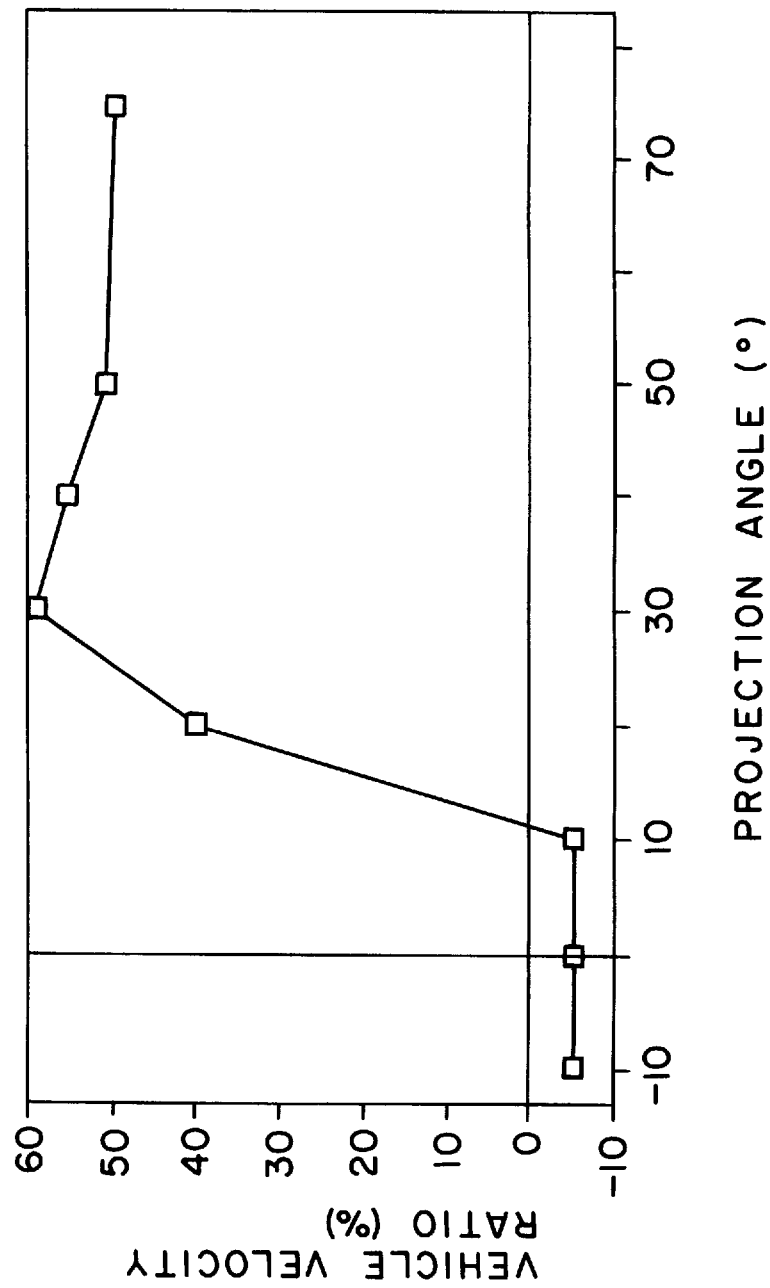
FIG. 6 is as graph showing the relationship between projection angle of a protruding portion, which is formed on the inner surface of a spoiler, and vehicle velocity ratio.

FIG. 6 is a graph showing the relationship between the projection angle θ of the protruding portion and the vehicle velocity ratio. It is possible to maintain the vehicle velocity ratio at a value of 30 or greater by selecting the value of θ to be 20° or greater.

The effects of the second embodiment are the same as the above-mentioned effects attained with the first embodiment. An additional advantage of the second embodiment is ease of manufacture since the inner surface 7 of the rear spoiler 3" is merely provided with the protrusion 5.

As many apparently widely different embodiments of the present invention can be made without departing from the spirit and scope thereof, it is to be understood that the invention is not limited to the specific embodiments thereof except as defined in the appended claims.

What is claimed is:

1. A rear spoiler for an automotive vehicle having a roof and a back surface, the roof comprising a first top surface that is substantially horizontal and an upper portion of the back surface, wherein the rear spoiler has a generally triangular cross-section and is constructed to be mounted adjacent to and spaced from the upper portion of the back surface and comprising an inner surface and a second top surface that is substantially horizontal and is parallel to the first top surface, an inlet having an inflow width between the inner surface of the rear spoiler and the back surface, and an outlet spaced from the inlet and having an outflow width between the inner surface of the rear spoiler and the back surface, and wherein the rear spoiler provides a vehicle velocity ratio ($V_1/V_2 \times 100$) of 30 or greater, where $V_1$ is the velocity of the vehicle and $V_2$ is the velocity of airflow exiting at the outlet of the rear spoiler, a ratio of outflow width to inflow width of 0.5~0.9, and an amount of projection of −1 mm or greater which is the distance between the second top surface of the rear spoiler and a reference plane extending rearwardly substantially horizantally from approximately the first top surface of the vehicle roof.

2. The rear spoiler according to claim 1 wherein the inner surface of the rear spoiler has a length between 20 mm and 100 mm, and the amount of projection does not exceed 50 mm.

3. The rear spoiler according to claim 1 wherein the ratio of outflow width to inflow width is 0.75.

4. The rear spoiler according to claim 1 wherein the vehicle velocity ratio does not exceed 60.

5. A rear spoiler for an automotive vehicle having a roof and a vehicle back surface comprised of a back surface of the roof and a substantially aligned rear window, wherein the rear spoiler has a generally triangular cross-section and is spaced from the back surface and has an inner surface that is parallel to the vehicle back surface, said inner surface having a lower portion with a protrusion which projects toward the vehicle back surface and forms an angle of 20° or greater with respect to said inner surface, an outlet having an outflow width between the inner surface of the rear spoiler at the protrusion and the vehicle back surface, and an inlet spaced from the outlet and having an inflow width between the inner surface of the rear spoiler and the vehicle back surface, wherein the ratio of outflow width to inflow width is 0.5~0.9;

the rear spoiler having a vehicle velocity ratio ($V_1/V_2 \times 100$) of 30 or greater, wherein $V_1$ is the velocity of the vehicle and $V_2$ is the velocity of airflow exiting at the outlet of the rear spoiler; and the roof having a first top surface that is substantially horizontal and the rear spoiler having a second top surface that is substantially horizontal and is parallel to the first top surface to provide an amount of projection of −1 mm or greater which is the distance between the second top surface of the rear spoiler and a reference plane extending rearwardly substanially horizantally from approximately the first top surface of the vehicle roof.

6. The rear spoiler according to claim 5, wherein said protrusion has an arcuate distal end.

7. The rear spoiler according to claim 5 wherein the amount of projection does not exceed about +50 mm.

8. A rear spoiler for an automotive vehicle having a roof and a vehicle back surface comprised of a back surface of the roof and a substantially aligned rear window, the roof comprising a first top surface and the back surface of the roof, the first top surface being substantially horizontal, wherein the rear spoiler has a generally triangular cross-section and is constructed to be mounted adjacent to and spaced from the back surface of the roof and comprising an inner surface and a second top surface, the second top surface being substantially horizontal and parallel to the first top surface, the inner surface of the rear spoiler having a lower portion with a protrusion which projects toward the vehicle back surface and forms an angle of 20° or greater with respect to said inner surface, an inlet having an inflow width between the inner surface of the rear spoiler and the back surface of the roof, and an outlet spaced from the inlet and having an outflow width between the inner surface of the rear spoiler at the protrusion and the vehicle back surface, and wherein the rear spoiler provides a vehicle velocity ratio ($V_1/V_2 \times 100$) of 30 or greater, where $V_1$ is the velocity of the vehicle and $V_2$ is the velocity of airflow exiting at the outlet of the rear spoiler, a ratio of outflow width to inflow width of 0.5~0.9, and an amount of projection of −1 mm or greater which is the distance between the substantially horizontal second top surface of the rear spoiler and a reference plane extending rearwardly and substantially horizontally from approximately the substantially horizontal first top surface of the vehicle roof.

9. The rear spoiler according to claim 8 wherein the amount of projection does not exceed about +50 mm.

10. A rear spoiler for an automotive vehicle having a roof and a back surface including a rear window, the roof comprising a first top surface and an upper portion of the back surface aligned with the rear window, wherein the rear spoiler is constructed to be mounted adjacent to and spaced from the upper portion of the back surface and comprising an inner surface and a second top surface, the first top surface of the roof and the second top surface of the spoiler being parallel and horizontal, an inlet having an inflow width between the inner surface of the rear spoiler and the back surface, and an outlet spaced from the inlet and having an outflow width between the inner surface of the rear spoiler and the back surface, and wherein the rear spoiler provides a vehicle velocity ration $V_1/V_2 \times 100$ of 30 or greater, where $V_1$ is the velocity of the vehicle and $V_2$ is the velocity of airflow exiting at the outlet of the rear spoiler, a ratio of outflow width to inflow width of 0.5~0.9, and an amount of projection of −1 mm or greater which is the distance between the second top surface of the rear spoiler and a reference plane extending rearwardly substantially horizantally from approximately the first top surface of the vehicle roof.

11. The rear spoiler according to claim 1 wherein the amount of projection does not exceed about +50 mm.

* * * * *

UNITED STATES PATENT AND TRADEMARK OFFICE
CERTIFICATE OF CORRECTION

PATENT NO. : 5,845,960
DATED : December 8, 1998
INVENTOR(S) : Koike et al.

It is certified that error appears in the above-identified patent and that said Letters Patent is hereby corrected as shown below:

Claim 1, col. 4, line 58, "horizantally" should be --horizontally--.

Claim 5, col. 5, line 26, "substanially horizantally" should be --substantially horizontally--.

Claim 10, col. 6, lines 41-42, "horizantally" should be --horizontally--.

Signed and Sealed this

Sixteenth Day of March, 1999

Attest:

Q. TODD DICKINSON

Attesting Officer

Acting Commissioner of Patents and Trademarks